(12) United States Patent  
Krenzer et al.

(10) Patent No.: US 8,105,001 B2
(45) Date of Patent: Jan. 31, 2012

(54) DRILLING TOOL

(75) Inventors: Ulrich F. Krenzer, Zirndorf (DE); Herbert R. Kauper, Nürnberg (DE)

(73) Assignee: Kennametal Inc., Latrobe, PA (US)

( * ) Notice: Subject to any disclaimer, the term of this patent is extended or adjusted under 35 U.S.C. 154(b) by 1248 days.

(21) Appl. No.: 11/755,369

(22) Filed: May 30, 2007

(65) Prior Publication Data

US 2008/0199268 A1    Aug. 21, 2008

(51) Int. Cl.
*B23B 51/02* (2006.01)

(52) U.S. Cl. .................................... 408/230; 408/227

(58) Field of Classification Search .............. 408/227, 408/229, 230, 59, 57, 144
See application file for complete search history.

(56) References Cited

U.S. PATENT DOCUMENTS

| | | | | |
|---|---|---|---|---|
| 2,164,573 A | * | 7/1939 | Christman | 408/227 |
| 2,479,136 A | * | 8/1949 | Schade | 408/223 |
| 2,859,645 A | * | 11/1958 | Emmons et al. | 408/230 |
| 2,903,922 A | * | 9/1959 | Ernst et al. | 408/230 |
| 3,089,359 A | * | 5/1963 | Poulin | 408/204 |
| 3,779,664 A | * | 12/1973 | Caley et al. | 408/225 |
| 3,977,807 A | * | 8/1976 | Siddall | 408/223 |
| 4,744,705 A | * | 5/1988 | Imanaga | 408/230 |
| 4,913,603 A | * | 4/1990 | Friedli et al. | 408/230 |
| 4,983,079 A | * | 1/1991 | Imanaga et al. | 408/230 |
| 5,078,554 A | * | 1/1992 | Kubota | 408/230 |
| 5,088,863 A | * | 2/1992 | Imanaga et al. | 408/230 |
| 5,452,971 A | * | 9/1995 | Nevills | 408/229 |
| 5,486,075 A | * | 1/1996 | Nakamura et al. | 408/230 |
| 6,126,367 A | * | 10/2000 | Reed | 408/1 R |
| 6,132,149 A | * | 10/2000 | Howarth et al. | 408/230 |
| 6,309,149 B1 | * | 10/2001 | Borschert et al. | 408/230 |
| 6,315,504 B1 | * | 11/2001 | Sekiguchi et al. | 408/144 |
| 6,991,409 B2 | * | 1/2006 | Noland | 407/63 |
| 2002/0090273 A1 | * | 7/2002 | Serwa | 409/132 |
| 2003/0039522 A1 | * | 2/2003 | Yanagida et al. | 408/230 |
| 2003/0129031 A1 | * | 7/2003 | Mast et al. | 408/144 |
| 2003/0175085 A1 | * | 9/2003 | Prokop | 408/59 |

FOREIGN PATENT DOCUMENTS

| | | |
|---|---|---|
| DE | 202 19 753 U1 | 4/2004 |
| EP | 0 290 520 B1 | 11/1987 |
| EP | 0 427 857 A1 | 5/1991 |
| WO | WO 88/03849 | 11/1988 |

OTHER PUBLICATIONS

German Search Report 10 2006 025 294.2-14.

* cited by examiner

*Primary Examiner* — Daniel Howell
*Assistant Examiner* — Paul M Janeski
(74) *Attorney, Agent, or Firm* — Larry R. Meenan (57) ABSTRACT

This application relates to a twist drill for use in a machine tool with a major cutting edge divided into two partial cutting edges by a chisel edge wherein longitudinal cutting edges extend along the length of the drill such that the first longitudinal cutting edge makes a rough cut and the second longitudinal cutting edge makes a finishing cut during operation.

20 Claims, 7 Drawing Sheets

DRILLING TOOL

BACKGROUND

1. Technical Field

This application relates to a drill for use in a machine tool with a major cutting edge divided into two partial cutting edges by a chisel edge (4), one partial cutting edge of which is a guide cutting edge (5) with a guide land (13) on its end farther from the chisel edge (4) in the radial direction (10), and with a support land (14) on the guide cutting edge/minor clearance face (11) associated with the guide cutting edge (5), such that the support land (14) and the guide land (13) between them form the boundaries of the guide cutting edge/minor clearance face (11) in the direction of rotation (3) of the drill.

2. Background Information

An example of a drill of this type is shown in EP-B-290 520 (Corresponding to U.S. Pat. No. 4,913,603), for example. This document also describes the problem known in the technical literature as "chatter", a problem that is experienced with drill during the drilling process when the irregular rotational action of the drill during the drilling process results in an irregular surface structure of the boring wall. This phenomenon is due in particular to the fact that linear or spiral chip flutes are shaped into the generated surfaces of the drills to remove the chips that are formed during the drilling process. Frequently, the chip flutes on one hand and the cutting edges of the drill on the other hand are distributed symmetrically over the periphery of the drill. This symmetrical distribution has the further disadvantage that the vibrations of the drill that cause the "chatter" recur periodically during the drilling process. This periodic recurrence of the vibrations causes an increase in the amplitude of the vibrations, i.e. a "build-up" of the chatter during the drilling process, with the result that the irregularities in the side walls of the hole which is being bored, which irregularities are also called ""chatter marks"" increase, resulting in a deterioration in the quality of the boring over the length of the drilling process.

To reduce this technical problem, the above referenced publication, for example, indicates that the minor cutting edges of the drill that are present on the drill periphery can be provided with lands. These lands are generally snug up against the inside wall of the boring and act on the drill in the manner of support fins. The publication describes the placement of a plurality of lands on the different cutting edges of the drill. An additional measure to prevent the untrue running of the drill is the asymmetrical arrangement of the chip flutes and correspondingly of the drill cutting edges. This measure is also described in the above referenced EP-B-290 520 (Corresponding to U.S. Pat. No. 4,913,603).

OBJECT OR OBJECTS

An object of at least one possible embodiment of the present application is to further reduce the tendency of drills to chatter.

SUMMARY

The solution taught by this patent application is based on the basic notion of dividing the major cutting edge of the drill into two functional areas, namely into a partial cutting edge that functions as a guide cutting edge and into another partial cutting edge that functions as a clearance cutting edge. The guide cutting edge thereby has a land on its end facing away from the chisel edge, i.e. in the vicinity of the transition from the end surface of the drill to the generated surface of the drill. This land delimits or essentially delimits the guide cutting edge/minor clearance face associated with the guide cutting edge on the one side. Viewed opposite to the direction of rotation of the drill, in the vicinity of the guide cutting edge/minor clearance face there is an additional support land, whereby the guide land and the support land are therefore located or essentially located on the guide cutting edge/minor clearance face, so that viewed in the direction of rotation of the drill, the guide land on one hand and the support land on the other hand each define or essentially define the limit of the guide cutting edge/minor clearance face on one side. That means that the guide major clearance face of the drill that is associated with the guide cutting edge transitions on its corner points that face away from the chisel edge or the drill tip in the radial direction into the support land or the guide land, and therefore the support land and the guide land form or essentially form the transition from the end-side guide cutting edge/major clearance face to the generated surface of the drill.

The guide land and the support land function in the manner of other drills to guide and support the drill during the drilling process on the inside wall of the boring. The support land and the guide land thereby form or essentially form an interacting pair of support fins on the periphery of the drill.

The clearance cutting edge which is also present, has a clearance angle on its transition to the associated clearance cutting edge/minor clearance face. In this manner, the drill is usually only slightly supported on the inside wall of the boring in the radial direction in the vicinity of the clearance cutting edge by the clearance cutting edge/minor cutting edge associated with the clearance cutting edge. That results in a continuous or essentially continuous cutting action of the clearance cutting edge/minor cutting edge, so that the clearance cutting edge/minor cutting edge removes or essentially removes the chatter marks on the inside surface of the boring very quickly or substantially quickly, so that the build-up of amplitude of the chattering described above is effectively or substantially effectively prevented.

In other words, the guide land and the support land in the vicinity of the guide cutting edge essentially guarantee a secure or substantially secure guidance of the drill in the boring, while the clearance cutting edge ensures or substantially ensures that any irregularities on the inside walls of the boring are quickly or relatively quickly removed during the drilling process, which results or essentially results in an unusually smooth boring wall on one hand and an optimized smooth running of the drill on the other hand. The depth of roughness in the vicinity of the boring wall is effectively or substantially effectively reduced with the embodiment or embodiments described herein.

The embodiment also may have the effect that the drill with its clearance cutting edge on the one hand and the clearance cutting edge/minor cutting edge on the other hand are always cutting or substantially always cutting the boring, while the guide cutting edge in combination with the guide land and the support land tracks the drill continuously or substantially continuously during the rotational motion. Finally, the clearance angle in the vicinity of the clearance cutting edge/minor clearance face provides optimal or substantially optimal chip removal. The guide cutting edge, the clearance angle corresponding to it with respect to the guide cutting edge/minor clearance face and the guide cutting minor cutting edge, which is constantly or substantially constantly cutting, also prevent or generally prevent a jamming of the drill during the drilling process.

Developments of at least one possible embodiment of the present application are described herein.

For the additional stabilization of the clearance cutting edge, in one particular configuration, a cutting edge land is provided between the clearance cutting edge and the clearance cutting edge/minor cutting edge. This edge land can be realized or substantially realized in the form of a single land or a double land. A cutting edge land of this type promotes or essentially promotes the removal of the chip and thus contributes or substantially contributes to reducing or substantially reducing the chattering tendency on one hand and to reducing or substantially reducing the risk of the drill jamming in the boring during the drilling process on the other hand. The cutting edge lands located both in the vicinity of the cutting corners of the clearance cutting edge as well as in the vicinity of the nose of the guide cutting edge stabilize or essentially stabilize the true or substantially true running of the drill and lead to an elongation of the active cutting edge. They further promote the build-up of an abrasive edge. Finally, they promote or essentially promote the upward removal of the chip, which in turn leads to an undamaged or essentially or substantially undamaged boring wall.

Providing a cutting edge corner radius in the vicinity of the noses of the guide cutting edge on one hand and of the clearance cutting edge on the other hand. This measure also promotes or substantially promotes the desired smooth or essentially smooth running of the tool.

Further in an embodiment a drill that has the clearance cutting edge (6) and the guide cutting edge (5) are oriented in relation to one another in the rotational direction (3) by an angular pitch (19) that is different from 180 degrees has a basically asymmetrical construction of the drill claimed by the embodiment for the prevention or substantial prevention of at least periodic chattering. The angular pitch between the clearance cutting edge and the guide cutting edge, which is different from 180 degrees, results in a deliberate or substantially deliberate drift of the drill in the vicinity or general vicinity of the clearance cutting edge and to a deliberate or substantially deliberate damping of the drill in the vicinity or general vicinity of the guide cutting edge to compensate or essentially compensate for this drift. This controlled or substantially controlled drift and its likewise controlled or likewise substantially controlled compensation result in particularly true or substantially true running of the drill.

In an even more advantageous or substantially advantageous configuration, the embodiment teaches that the angular pitch between the guide cutting edge and the clearance cutting edge has a value that equals a prime number. There is an embodiment with an angular pitch of 193 degrees. An indivisible angular pitch ideally or almost ideally prevents or essentially prevents the build-up of periodic vibrations.

Embodiments clearly or essentially clearly show that the embodiment relates or substantially relates both to drills with straight flutes as well as to drills with spiral chip flutes, namely twist drills. These drills can also be equipped with additional cooling channels that run through the drill core, whereby the cooling channels can also be either straight or spiral. In one embodiment it is also possible to combine or substantially combine a twist drill with straight or substantially straight cooling channels.

An embodiment is a drill with that the length of the drill being 20-30 times the diameter of the drill which relates to a realization of the drill to form of a deep-hole drill. An embodiment has the drill tip (27) and/or a drill area (28) made of carbide and a shank (30) made of steel, optionally with a driving surface (31) made of steel, on such a deep-hole drill it is sufficient or substantially sufficient to manufacture the areas of the deep-hole drill at the working site, i.e. on the tip of the drill or in the drilling section, from carbide, while the other areas of the drill that function only as supports, i.e. the taper, the shank or the driving surfaces, can be made of an economical tool steel. These support materials do not necessarily need to have the special properties of a carbide material. An embodiment with a drill area (28) with a cylindrical enveloping surface with a constant or substantially constant diameter that it is also possible or essentially possible to manufacture the drill so that it does not necessarily taper beginning at the tip of the drill. The area of the drill that is adjacent to the tip of the drill therefore may have a constant or substantially constant diameter in this embodiment. Only the adjacent rear portion tapers toward the shank. As a result of this cylindrical configuration of the envelope surface of the drill with a constant diameter in the entire drilling area, the pressure on the guide lands is reduced or substantially reduced. The contact area of the major and minor cutting edges is thereby elongated or substantially elongated. The lack of taper in the drilling area means that the diameter of the drill is not reduced or is essentially not reduced even when it is re-sharpened. This has a positive or generally positive effect on the quality of the drilling. The drill of the embodiment makes possible better tolerances or substantially better tolerances than are possible than with other drills.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

Exemplary embodiments are explained in greater detail below and are illustrated in the accompanying drawings, in which.

DESCRIPTION OF EMBODIMENT OR EMBODIMENTS

The drill illustrated in the accompanying figures has a basic or substantially basic shape that has a hollow cylindrical cross section or substantially hollow cylindrical cross section, and consists of a drill core 1 and two chip flutes 2 worked into the drill core 2. During the drilling process, the drill rotates or essentially rotates in the direction of rotation 3. During the drilling, the cutting is done or essentially done by the chisel edge 4, the guide edge 5 and the clearance cutting edge 6 which are shown or essentially shown on the end surface of the drill in the figures. The chisel edge 4, the guide edge 5 and the clearance cutting edge 6 form or substantially form the major cutting edge of the drill, whereby the chisel edge 4 divides or substantially divides this major cutting edge in two parts. The chisel edge 4—if desired—can also be pointed or substantially pointed.

The two partial cutting edges 5, 6 that extend or substantially extend the chisel edge 4 to the major cutting edge are associated or essentially associated respectively with the major clearance faces and minor clearance faces. In the case of the guide cutting edge 5, the guide cutting edge/major clearance face 7 is visible or substantially visible in the lower right quadrant of FIG. 1, and the clearance cutting edge/major clearance face 8 that is associated with the clearance cutting edge 6 is visible or substantially visible in the upper left quadrant of FIG. 1. The two major clearance faces 7, 8 are each interrupted or essentially interrupted by a cooling channel opening 9. The cooling channel openings 9 are the outlet openings or essentially the outlet openings of two cooling channels that run through the drill shank in the longitudinal or essentially longitudinal direction of the drill. In an embodiment, when the drill is in operation, a coolant-lubricant is able to reach the point of action of the drill in the boring by means of the cooling channel openings 9.

Figure 1:
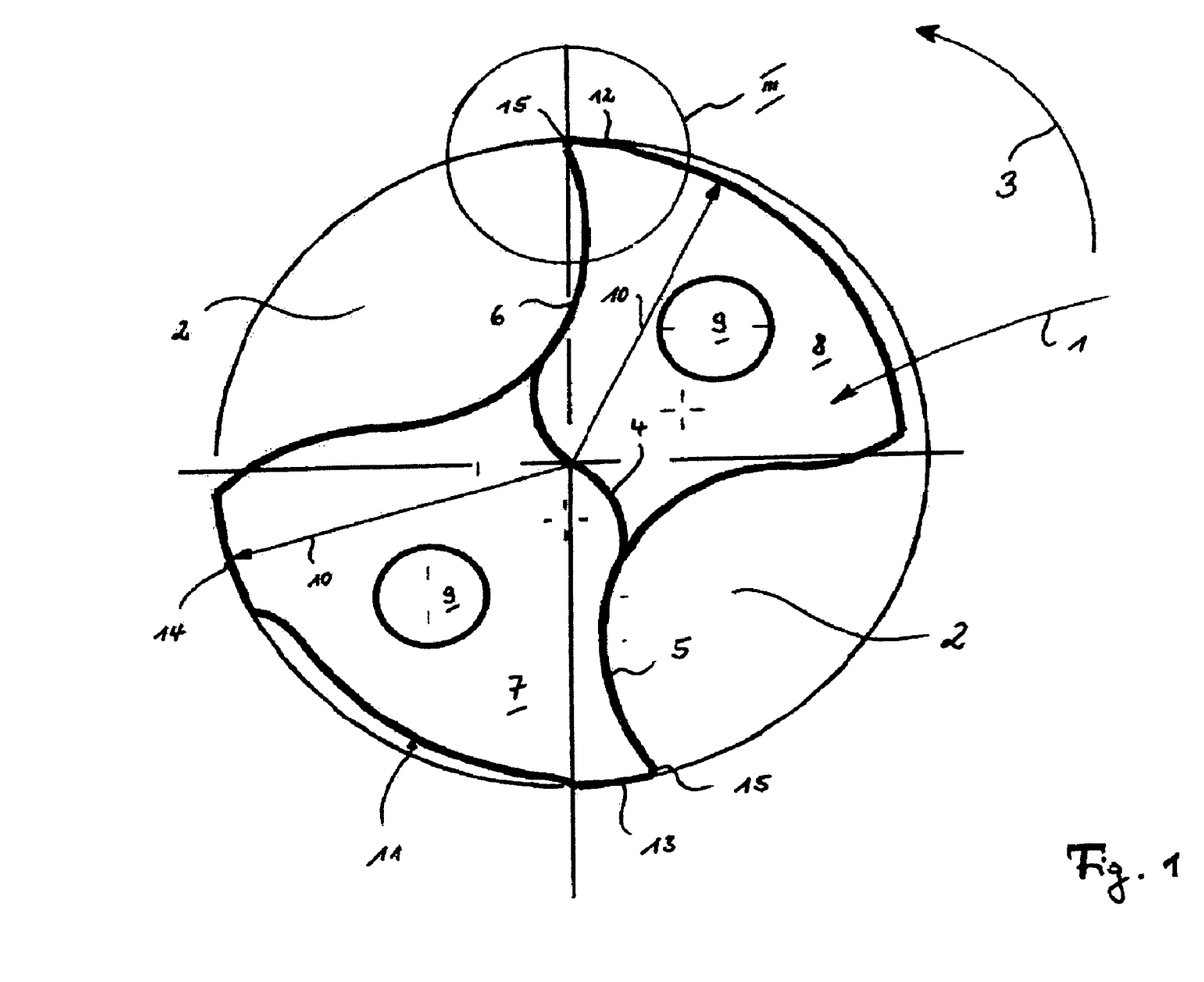
FIG. 1 is a plan view from overhead of the end surface of a drill claimed by the application.
Figure 2A:
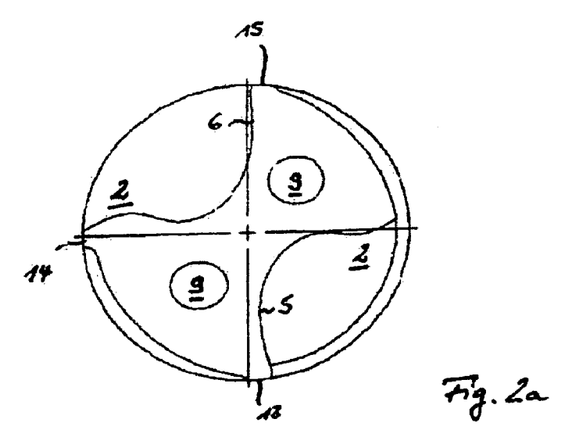
FIG. 2 is a plan view from overhead of the end surface of several different variants of the drill claimed by the application.
Figure 2B:
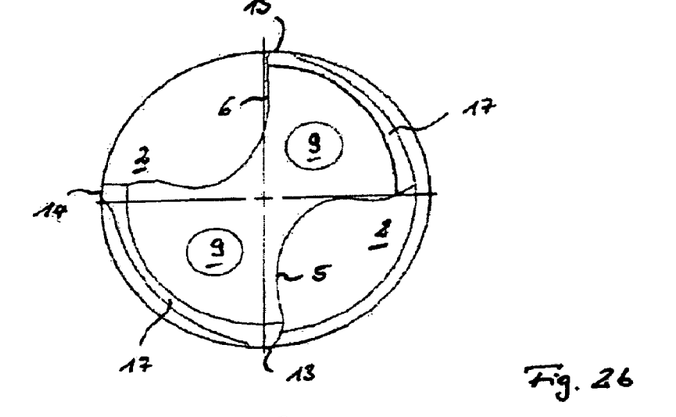
Figure 2C:
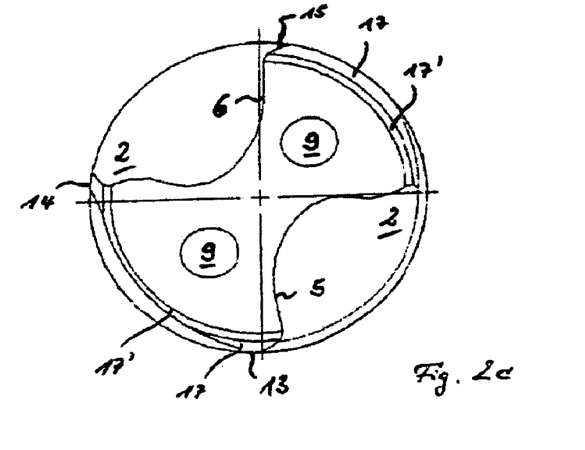
Figure 2D:
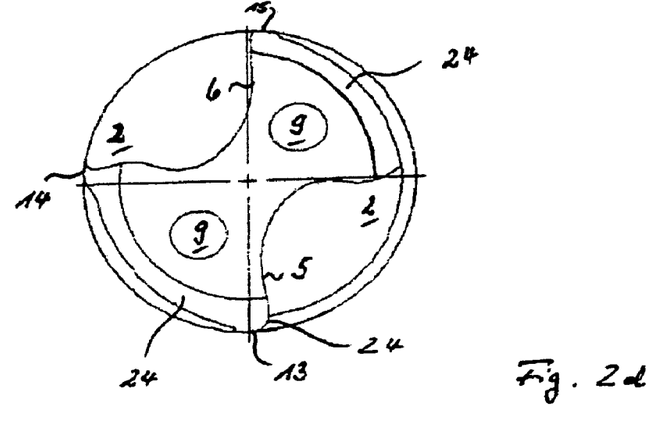

Adjacent to the guide cutting edge/major clearance face 7 in the radial direction 10 is the guide cutting edge/minor clearance face 11. The guide cutting edge/minor clearance face 11 runs on the cylindrical outside envelope of the drill core 1, i.e. perpendicular or essentially perpendicular to the plane of the drawing in the figures, as shown in FIG. 1. Analogously, adjacent to the clearance cutting edge of the major clearance face 8 in the radial direction 10 is the clearance cutting edge/minor clearance face 12. The clearance cutting edge/minor clearance face 12 also runs along the outside cylindrical envelope of the drill core 1 perpendicular or essentially perpendicular to the plane of the drawing in the figures, as shown in FIG. 1.

The guide cutting edge/minor clearance face 11 is delimited or essentially delimited in the direction of rotation 3 on its end adjacent or essentially adjacent to the guide cutting edge 5 by the guide land 13 which is adjacent or essentially adjacent to the cutting edge 15. The rear end of the guide cutting edge/minor clearance face 11, viewed opposite or essentially opposite to the direction of rotation 3, forms or substantially forms the support land.

FIG. 2 shows several variants of the embodiment illustrated in FIG. 1. For purposes of illustration, several reference numbers from FIG. 1 have been omitted in FIG. 2. To more clearly indicate the differences, FIG. 2a shows the embodiment illustrated in FIG. 1 unchanged. FIG. 2b shows a modified embodiment of the drill claimed by the embodiment with a cutting/edge land 17 on the guide cutting edge 5. In FIG. 2c, one cutting edge land 17 and an additional cutting edge land 17' are realized both on the guide cutting edge 5 and on the clearance cutting edge 6. FIG. 2c shows a drill with a double cutting edge land. Finally, FIG. 2d shows an embodiment with a cutting edge radius 14 realized in the vicinity of the guide cutting edge 5 to round off the cutting edge of the guide cutting edge 5. The purpose of all these measures is to reduce or substantially reduce the pressure that is exerted on the guide land 13 and on the support land 14 during the rotation of the tool.

Figure 3:
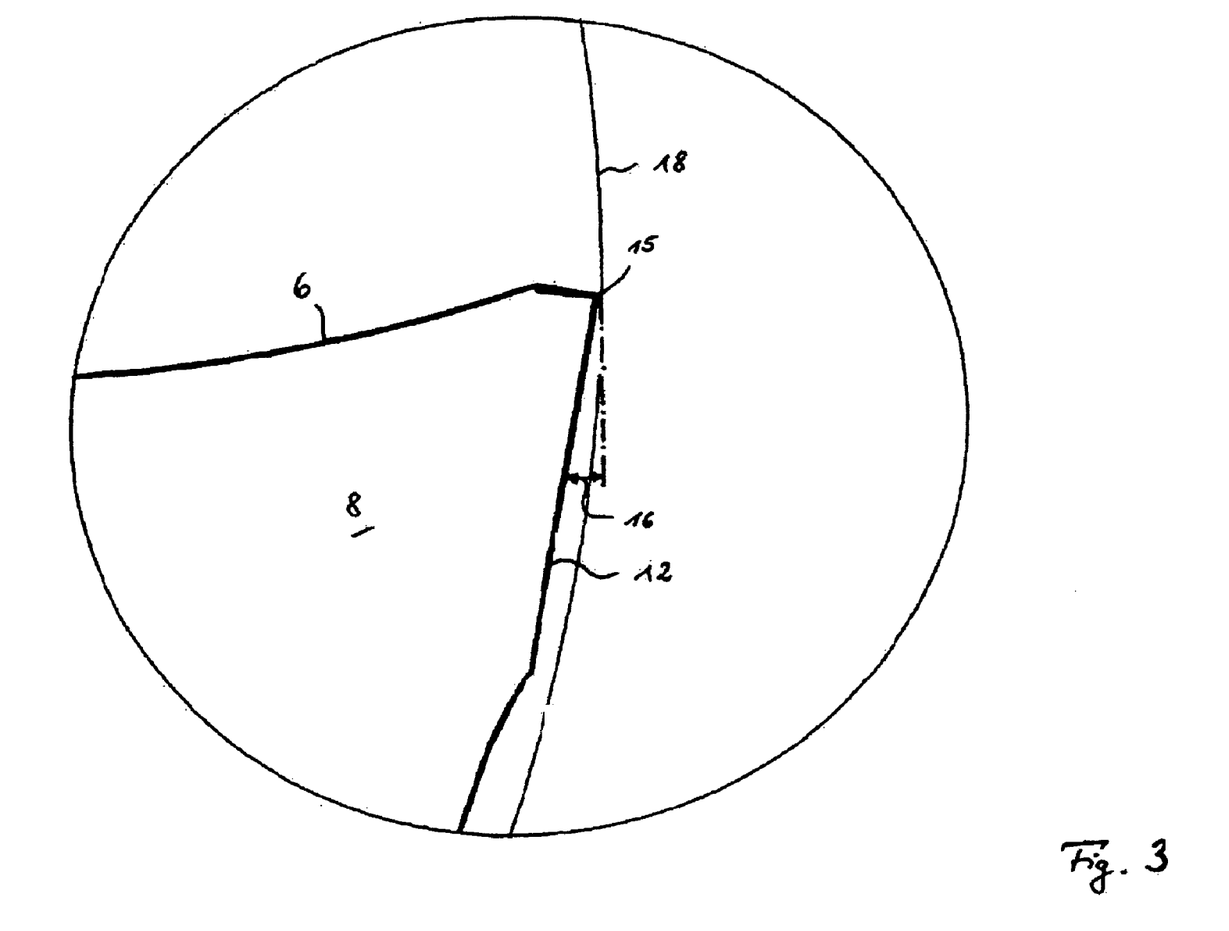
FIG. 3 is an enlarged detail of detail III in FIG. 1.
Figure 4A:
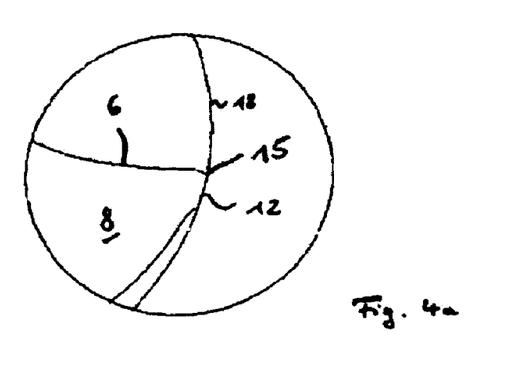
FIG. 4 shows enlarged details of detail III in FIG. 1 of several different embodiments of the drill claimed by the application.
Figure 4B:
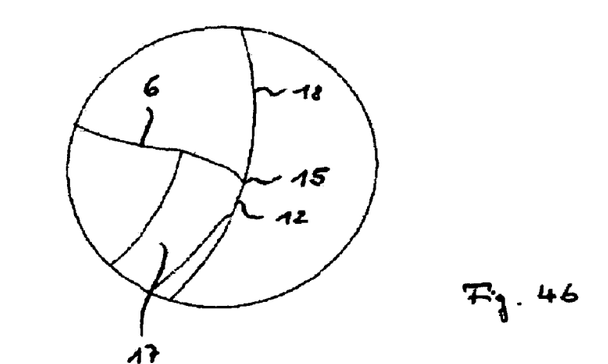
Figure 4C:
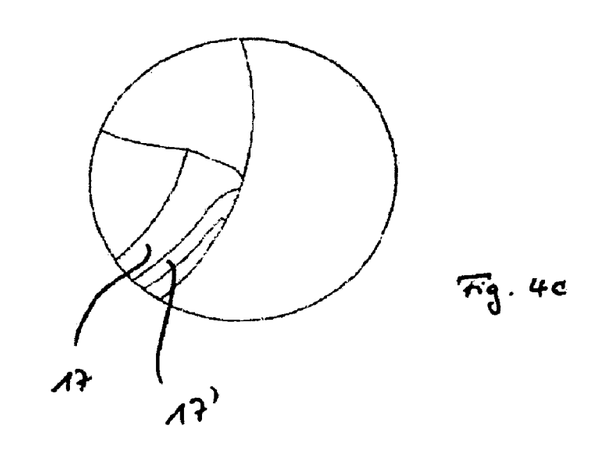
Figure 4D:
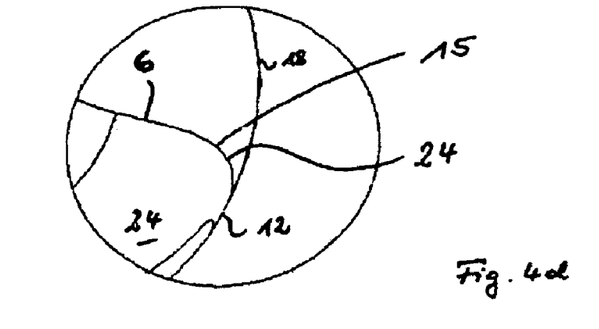
Figure 5A:
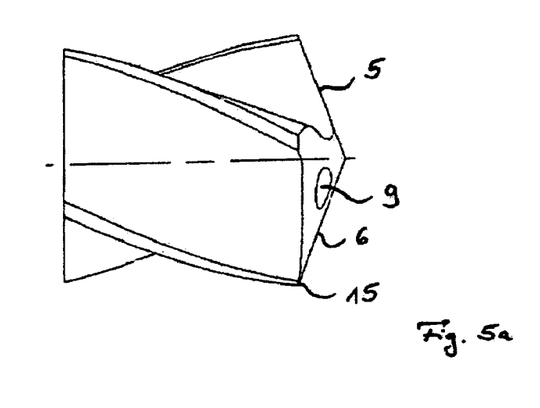
FIG. 5 is a side view of several different configurations of the drill tip of the drill claimed by the application.
Figure 5B:
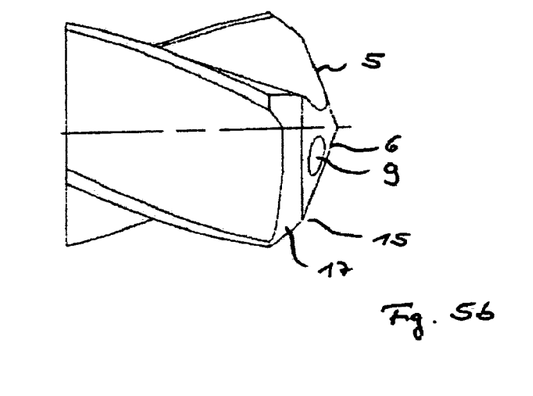
Figure 5C:
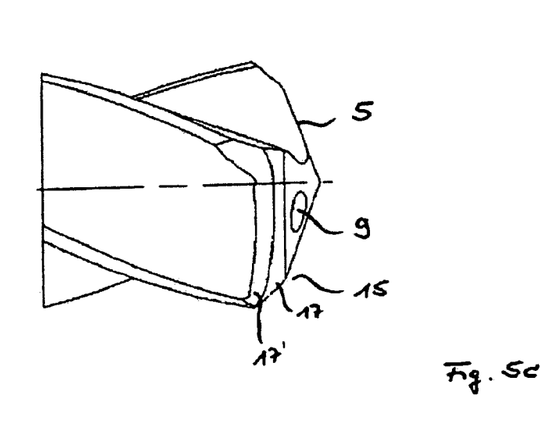
Figure 5D:
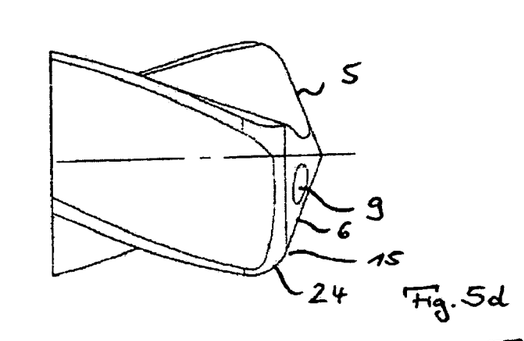

The cutting edge 15 of the clearance cutting edge 6 is illustrated in FIG. 3. FIG. 3 also shows that the clearance cutting edge 6 has a clearance angle 16 at the transition to the clearance cutting edge/minor clearance face 12. In FIG. 3, for purposes of illustration, the inner cylindrical surface 18 of the boring is shown only schematically.

FIG. 4 shows several variants of the cutting edge 15 of the clearance cutting edge 6 illustrated in FIG. 3. Once again, for purposes of illustration, some of the reference numbers from the illustration in FIG. 3 have been omitted. To make the comparison easier, FIG. 4a also repeats or essentially repeats the illustration of the embodiment shown in FIG. 3. FIG. 4b shows a cutting edge land 17 in the vicinity of the major cutting edge 6. FIG. 4c shows a double cutting corner land, which is composed of one cutting edge land 17 and another cutting edge land 17'. FIG. 4d illustrates one embodiment of the drill claimed by the application with a rounded cutting edge 15. For this purpose, a cutting edge radius 24 is provided in the vicinity of the cutting edge 15 of the major cutting edge 6.

FIG. 5 shows a side view of the drill shown in the overhead view in FIG. 4. FIG. 5a shows one embodiment of the drill claimed by the application with a cutting edge 15 without or essentially without further machining. FIG. 5b shows the drill claimed by the invention with a simple cutting edge land 17 in the vicinity of the cutting edge 15. FIG. 5c shows one exemplary embodiment of the drill claimed by the application with a double cutting edge land, which consists of a cutting edge land 17 and an additional cutting edge land 17' next to the cutting edge land 17. Finally, FIG. 5d shows one embodiment of the drill claimed by the application with a rounded portion 24 in the vicinity of the cutting edge 15.

Figure 6:
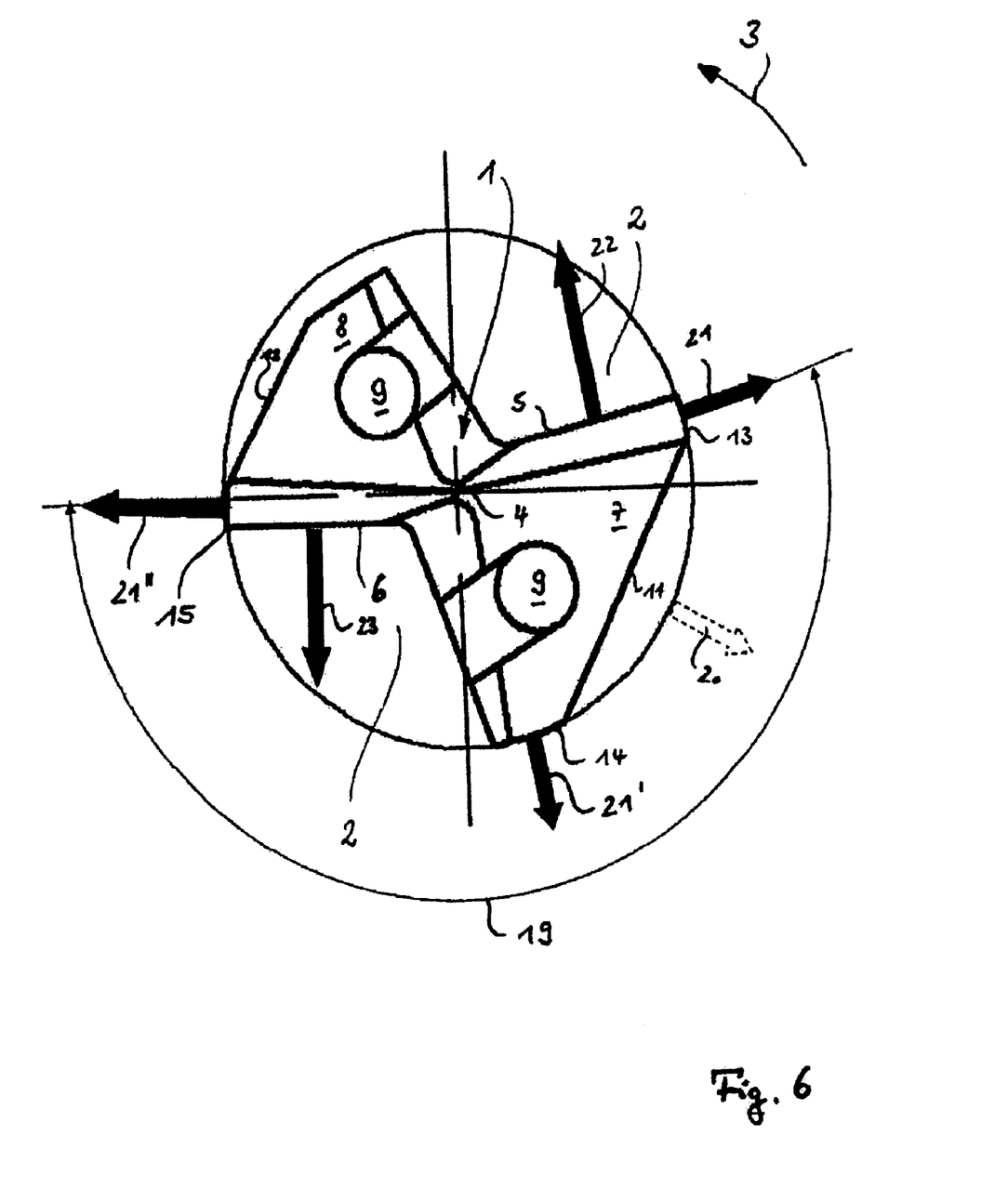
FIG. 6 is a schematic illustration of the distribution of forces on the drill claimed by the application.

FIG. 6 shows the asymmetrical or essentially asymmetrical construction of the drill core 1 of the drill claimed by the embodiment. The angular pitch 19 in the direction of rotation 3, measured between the clearance cutting edge 6 and the guide cutting edge 5 is different or essentially different from 180 degrees. The angular pitch 19 should or essentially should be a prime number. An angular pitch 19 of 193 degrees is advantageous or essentially advantageous.

As a result of the symmetrical or essentially symmetrical construction of the drill core on account of the angular pitch 19 that is not 180 degrees, the two halves of the drill core 1 separated by the chisel cutting edge 4 also weigh different amounts. That generally leads to a drift of the drill during the drilling process. This drift is represented by the directional arrow 20 drawn in dotted lines in FIG. 6. The drift represented by the directional arrow 20 is compensated for, however, by the guide land 13 and the support land 14. The guide land 13 thereby exerts a passive force 21, while the support land 14 produces a passive force 21'. For purposes of explanation, it should also be mentioned that the guide cutting edge cutting force 22 and the clearance cutting edge cutting force 23 are different. It should also be mentioned that a passive force 21" is also exerted in the vicinity of the cutting edge 15.

As a result of the different passive forces 21, 21', 21" on the one hand and the different cutting forces 22, 23 on the other hand, the jamming of the drill in the boring is prevented or substantially prevented, which leads to an optimized or essentially optimized boring surface quality.

Figure 7:
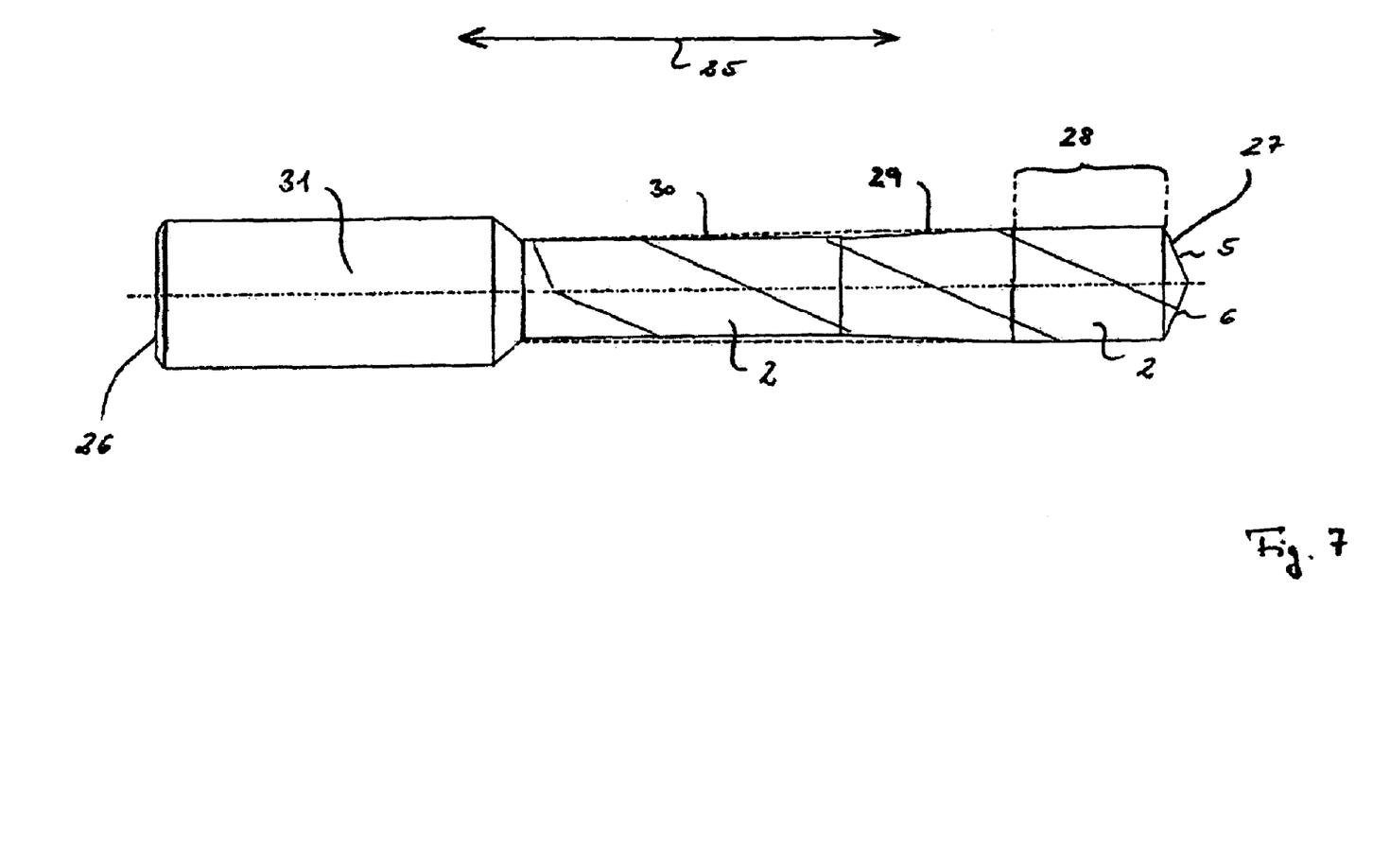
FIG. 7 is a schematic side view of the drill.

The schematic drawing in FIG. 7 shows that the drill claimed by the embodiment is divided into several areas in the longitudinal direction 25 of the drill. The drill extends in the longitudinal direction of the drill from its machine end 26 to its drill tip 27. The drill tip 27 hereby carries a major cutting edge, which for its part consists in turn of the chisel edge 4, the guide cutting edge 5 and the clearance cutting edge 6. Adjacent to the drill tip 27, in the longitudinal direction 25 of the drill, is the cylindrical portion of the drill area 28. The drill area 28 ends on its side farther from the drill tip 27 in the longitudinal direction 25 of the drill in a taper 29 into the shank 30. The shank 30 has, on its machine end 26 farther from the drill tip 27, a driving surface 31 for the machine tool in which the drill is inserted.

On the drill claimed by the embodiment, the drill area 28 is as long as possible. The drill area 28 has a cylindrical cross section or an essentially cylindrical cross section. The constant or essentially constant cylindrical cross section of the drill area 28 does not have any type of taper or essentially any type of taper or any similar shape or essentially any similar shape. This configuration has or may have the advantage that the drill does not change or essentially change its contour when it is re-sharpened.

This configuration, without a taper in the drill area 28, first of all makes possible or essentially makes possible the arrangement and configuration of the guide cutting edge and the clearance cutting edge selected by the embodiment. The support land 14 and the guide land 13 also contribute or substantially contribute to this possibility. These remarks also apply for the other characteristics of the configuration.

One feature or aspect of an embodiment is believed at the time of the filing of this patent application to possibly reside broadly in a drill with a major cutting edge divided into two partial cutting edges by a chisel edge (4), one partial cutting edge of which is a guide cutting edge (5) with a guide land (13) on its end farther from the chisel edge (4) in the radial direction (10), and with a support land (14) on the guide cutting edge/minor clearance face (11) associated with the guide cutting edge (5), such that the support land (14) and the guide land (13) between them form the boundaries of the guide cutting edge/minor clearance face (11) in the direction of rotation (3) of the drill, characterized in that the other partial cutting edge is a clearance cutting edge (6) with a clearance angle (16) with respect to its associated clearance cutting edge/minor clearance face (12).

The components disclosed in the various publications, disclosed or incorporated by reference herein, may possibly be used in possible embodiments of the present invention, as well as equivalents thereof.

The details in the patents, patent applications and publications may be considered to be incorporable, at applicant's option, into the claims during prosecution as further limitations in the claims to patentably distinguish any amended claims from any applied prior art.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

Another feature or aspect of an embodiment is believed at the time of the filing of this patent application to possibly reside broadly in a drill, characterized by a cutting edge land (17) on the cutting edge (15) of the clearance cutting edge (6) and/or on the cutting edge (15) of the guide cutting edge (5).

The appended drawings in their entirety, including all dimensions, proportions and/or shapes in at least one embodiment of the invention, are accurate and are hereby included by reference into this specification.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

Yet another feature or aspect of an embodiment is believed at the time of the filing of this patent application to possibly reside broadly in a drill, characterized by a double land, such that a cutting edge land (17) and an additional cutting edge land (17) are realized on the cutting edge (15) of the clearance cutting edge (6) and/or on the cutting edge of the guide cutting edge (5).

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

Still another feature or aspect of an embodiment is believed at the time of the filing of this patent application to possibly reside broadly in a drill, characterized by a cutting edge radius (24) on the cutting edge (15) of the clearance cutting edge (6) and/or on the cutting edge of the guide cutting edge (5).

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

A further feature or aspect of an embodiment is believed at the time of the filing of this patent application to possibly reside broadly in a drill, characterized in that the clearance cutting edge (6) and the guide cutting edge (5) are oriented in relation to one another in the rotational direction (3) by an angular pitch (19) that is different from 180 degrees.

Another feature or aspect of an embodiment is believed at the time of the filing of this patent application to possibly reside broadly in a drill as recited in claim 5, characterized in that the angular pitch (19) between the clearance cutting edge (6) and the guide cutting edge (5) is a prime number.

All of the patents, patent applications and publications recited herein, and in the Declaration attached hereto, are hereby incorporated by reference as if set forth in their entirety herein.

Yet another feature or aspect of an embodiment is believed at the time of the filing of this patent application to possibly reside broadly in a drill, characterized in that the angular pitch (19) is 193 degrees.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

Still another feature or aspect of an embodiment is believed at the time of the filing of this patent application to possibly reside broadly in a drill, characterized by straight chip flutes (2) in the drill shank.

It will be understood that the examples of patents, published patent applications, and other documents which are included in this application and which are referred to in paragraphs which state "Some examples of . . . which may possibly be used in at least one possible embodiment of the present application . . ." may possibly not be used or useable in any one or more embodiments of the application.

The sentence immediately above relates to patents, published patent applications and other documents either incorporated by reference or not incorporated by reference.

A further feature or aspect of an embodiment is believed at the time of the filing of this patent application to possibly reside broadly in a drill, characterized by spiral chip flutes (2) in the drill shank.

The corresponding foreign and international patent publication applications, namely, Federal Republic of Germany Patent Application No. 10 2006 025 294.2, filed on May 31, 2006, having inventor(s) Ulrich F. KRENZER and Herbert R. KAUPER, and DE-OS 10 2006 025 294.2 and DE-PS 10 2006 025 294.2, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

Another feature or aspect of an embodiment is believed at the time of the filing of this patent application to possibly reside broadly in a drill, characterized in that the length of the drill being 20-30 times the diameter of the drill.

All of the patents, patent applications or patent publications, which were cited in the German Examination Report dated Feb. 5, 2007, and/or cited elsewhere are hereby incorporated by reference as if set forth in their entirety herein as follows: European Patent Publication No. 427 857 A1 and German Patent Publication No. 202 19 753 U1.

Yet another feature or aspect of an embodiment is believed at the time of the filing of this patent application to possibly reside broadly in a drill, characterized by the drill tip (27) and/or a drill area (28) made of carbide and a shank (30) made of steel, optionally with a driving surface (31) made of steel.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

One feature or aspect of an embodiment is believed at the time of the filing of this patent application to possibly reside broadly in a drill, characterized by a drill area (28) with a cylindrical enveloping surface with a constant or substantially constant diameter.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

Drill with a major cutting edge divided into two partial cutting edges by a chisel edge (4), one partial cutting edge of which is a guide cutting edge (5) with a guide land (13) on its end farther from the chisel edge (4) in the radial direction (10), and with a support land (14) on the guide cutting edge/minor clearance face (11) associated with the guide cutting edge (5), such that the support land (14) and the guide land (13) between them form the boundaries of the guide cutting edge/minor clearance face (11) in the direction of rotation (3) of the drill, and the other partial cutting edge is a clearance cutting edge (6) with a clearance angle (16) with respect to its associated clearance cutting edge/minor clearance face (12).

AT LEAST PARTIAL NOMENCLATURE

1 Drill core
2 Chip flute

3 Direction of rotation
4 Chisel edge
5 Guide cutting edge
6 Clearance cutting edge
7 Guide cutting edge/major clearance face
8 Clearance cutting edge/major clearance face
9 Cooling channel opening
10 Radial direction
11 Guide cutting edge/minor clearance face
12 Clearance cutting edge/minor clearance face
13 Guide land
14 Support land
15 Cutting edge
16 Clearance angle
17, 17' Simple land
18 Internal generated surface
19 Angular pitch
20 Directional arrow
21, 21', 21" Passive force
22 Guide cutting edge cutting force
23 Clearance cutting edge cutting force
24 Cutting edge radius
25 Drill longitudinal direction
26 Machine end
27 Drill tip
28 Drill area
29 Taper
30 Shank
31 Driving surface

What is claimed is:

1. A drill comprising:
a tip portion comprising a tip;
a longitudinal, rotational axis;
a first flute and a second flute;
a chisel edge being disposed at said tip of said drill;
a first cutting tooth and a second cutting tooth being disposed between said flutes and being separated by said chisel edge;
said first cutting tooth being asymmetrical with respect to said second cutting tooth;
said first cutting tooth being of substantially similar size and comprising a substantially similar amount of material as said second cutting tooth;
said first cutting tooth having a land which extends over approximately 90 degrees, and said second cutting tooth having a land which extends over approximately 90 degrees;
said land of said first cutting tooth extends over a greater number of degrees than said land of said second cutting tooth;
said first cutting tooth comprising:
  a first longitudinal cutting edge being disposed longitudinally along at least a portion of said first flute and being configured to make a rough cut in material in a rotational direction during operation;
  a first tip cutting edge being disposed on said tip portion of said drill and adjacent said first flute and being configured to first cut material during operation;
  a guide margin being disposed adjacent said first longitudinal cutting edge and being configured to follow said first longitudinal cutting edge during rotation;
  said guide margin having a substantially constant radius measured from the rotational axis;
  a support margin being configured to minimize vibration during cutting and being disposed to follow said guide margin during rotation and being disposed separate from and away from said guide margin;
  said support margin having a substantially constant radius being substantially the same as the radius of said guide margin; and
  a region having points with radii being less than the radius of said guide margin and said support margin being disposed between said guide margin and said support margin; and
said second cutting tooth comprising:
  a second longitudinal cutting edge being disposed longitudinally along at least a portion of said second flute and being configured to cut material in the rotational direction during operation;
  a second tip cutting edge being disposed on said tip portion of said drill and adjacent said second flute and being configured to cut material;
  a clearance face being disposed adjacent said second longitudinal cutting edge and said second tip cutting edge and being configured to follow said second longitudinal cutting edge during rotation;
  said second longitudinal cutting edge and said clearance face being configured to make a smoothing and finishing cut to minimize roughness formed by a rough cut by said first longitudinal cutting edge; and
  points on said clearance face being disposed closer to the rotational axis than said second longitudinal cutting edge is disposed to the rotational axis.

2. The drill according to claim 1, wherein:
said flutes comprise spiral flutes;
said first tooth comprises a cutting face configured and disposed to extend from said chisel edge to said land;
said second tooth comprises a cutting face configured and disposed to extend from said chisel edge to said land;
at least one of said first tooth and said second tooth comprises:
  a first cutting edge land disposed between said cutting face and said land; and
  said cutting face and said first cutting edge land are disposed at different angles with respect to the longitudinal, rotational axis, wherein said first cutting edge land is disposed at a lesser angle with respect to the longitudinal, rotational axis than said cutting face.

3. The drill according to claim 2, wherein at least one of said first tooth and said second tooth comprises:
a second cutting edge land disposed between said first cutting edge land and said land; and
each of said cutting face, said first cutting edge land, and said second cutting edge land are disposed at different angles with respect to the longitudinal, rotational axis, wherein said second cutting edge land is disposed at a lesser angle with respect to the longitudinal, rotational axis than each of said cutting face and said first cutting edge land.

4. The drill according to claim 3, wherein said cutting faces of said first tooth and said second tooth are substantially conical.

5. The drill according to claim 4, wherein said land of said first cutting tooth extends over more than 90 degrees, and said land of said second cutting tooth extends over less than 90 degrees.

6. The drill according to claim 5, wherein said second cutting edge land is disposed further away from the rotational axis than said first cutting edge land.

7. The drill according to claim 6, wherein said drill comprises cooling channels.

8. The drill according to claim 7, wherein said first longitudinal cutting edge and said second longitudinal cutting edge are angularly disposed opposite one another at an angle other than 180 degrees.

9. The drill according to claim 8, wherein said first longitudinal cutting edge and said second longitudinal cutting edge are angularly disposed opposite one another at an angle of 193 degrees.

10. The drill according to claim 9, wherein the overall length of said drill is 20 to 30 times the diameter of the drill.

11. The drill according to claim 10, wherein:
said drill further comprises:
　a shank portion;
　a fluted portion between said tip portion and said shank portion; and
　a driving portion connected to said shank portion and configured to be inserted into a drive;
said tip portion comprises carbide; and
a portion of said fluted portion immediately adjacent said tip portion comprises carbide.

12. The drill according to claim 11, wherein:
said shank comprises steel; and
said driving portion comprises steel.

13. The drill according to claim 12, wherein:
said portion of said fluted portion immediately adjacent said tip portion has a constant diameter; and
another portion of said fluted portion has a tapered diameter.

14. The drill according to claim 1, wherein:
said flutes comprise straight flutes;
said first tooth comprises a cutting face configured and disposed to extend from said chisel edge to said land;
said second tooth comprises a cutting face configured and disposed to extend from said chisel edge to said land;
at least one of said first tooth and said second tooth comprises:
　a first cutting edge land disposed between said cutting face and said land; and
　said cutting face and said first cutting edge land are disposed at different angles with respect to the longitudinal, rotational axis, wherein said first cutting edge land is disposed at a lesser angle with respect to the longitudinal, rotational axis than said cutting face.

15. The drill according to claim 14, wherein at least one of said first tooth and said second tooth comprises:
　a second cutting edge land disposed between said first cutting edge land and said land; and
　each of said cutting face, said first cutting edge land, and said second cutting edge land are disposed at different angles with respect to the longitudinal, rotational axis, wherein said second cutting edge land is disposed at a lesser angle with respect to the longitudinal, rotational axis than each of said cutting face and said first cutting edge land.

16. The drill according to claim 1, wherein said land of said first cutting tooth extends over more than 90 degrees, and said land of said second cutting tooth extends over less than 90 degrees.

17. The drill according to claim 16, wherein said first longitudinal cutting edge and said second longitudinal cutting edge are angularly disposed opposite one another at an angle other than 180 degrees.

18. The drill according to claim 17, wherein said first longitudinal cutting edge and said second longitudinal cutting edge are angularly disposed opposite one another at an angle of 193 degrees.

19. The drill according to claim 1, wherein:
said drill further comprises:
　a shank portion;
　a fluted portion between said tip portion and said shank portion; and
　a driving portion connected to said shank portion and configured to be inserted into a drive;
said portion of said fluted portion immediately adjacent said tip portion is longer than the diameter of said tip portion and has a constant diameter; and
another portion of said fluted portion has a tapered diameter.

20. The drill according to claim 19, wherein:
said tip portion comprises carbide;
said portion of said fluted portion immediately adjacent said tip portion comprises carbide;
said shank comprises steel; and
said driving portion comprises steel.

* * * * *

UNITED STATES PATENT AND TRADEMARK OFFICE
CERTIFICATE OF CORRECTION

PATENT NO.         : 8,105,001 B2
APPLICATION NO.    : 11/755369
DATED              : January 31, 2012
INVENTOR(S)        : Ulrich F. Krenzer et al.

It is certified that error appears in the above-identified patent and that said Letters Patent is hereby corrected as shown below:

On the title page, item [30],
Please add the following information in the first column of the Front Page.
--Foreign Application Priority Data
May 31, 2006 (DE) 10 2006 025 294.2--

Signed and Sealed this
Twelfth Day of June, 2012

David J. Kappos
*Director of the United States Patent and Trademark Office*